April 29, 1952  G. C. HUPPERTZ  2,594,650
FILTER CONSTRUCTION
Filed Oct. 3, 1949
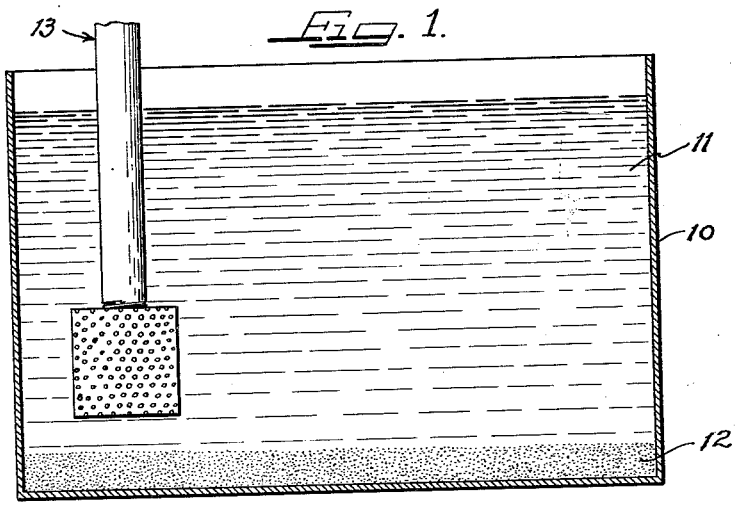
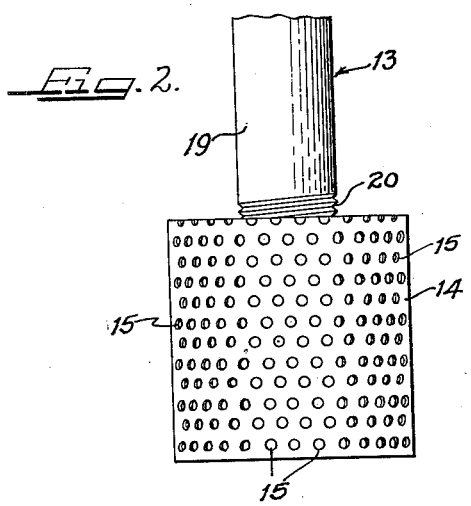
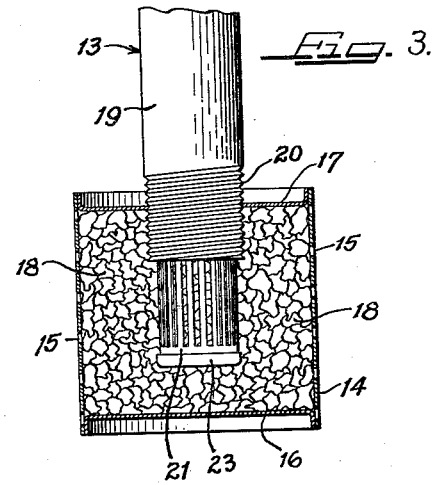
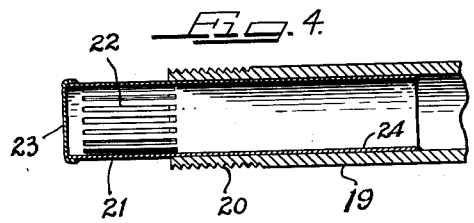
Inventor
GEORGE C. HUPPERTZ Patented Apr. 29, 1952

2,594,650

UNITED STATES PATENT OFFICE 2,594,650

FILTER CONSTRUCTION

George C. Huppertz, St. Charles, Ill.

Application October 3, 1949, Serial No. 119,339

1 Claim. (Cl. 210—98)

This invention relates to improvements in filters of the type for filtering solids from fluids.

In the use of concentrated solutions such as salt, sugar, or the like, it is frequently desirable to mix in a tank or other receptacle a greater quantity of the solid material with liquid than is necessary to insure saturation. The excess of material not absorbed in solution gradually falls to the bottom of the receptacle. In drawing the solution from its container, some of the excess material may be disturbed and be withdrawn in suspension with the saturated solution. This could result during withdrawal of the solution of varying concentrations in the same batch. Similarly, the concentrations of various batches could vary widely. To control the concentration within narrow limits requires a filtering of the solids in the solution as the solution is withdrawn from the mixing or storage tank. My invention seeks to provide such a control by a filter construction.

An important object of this invention, then, is to provide a filter construction for filtering solids from a liquid stream to thereby insure a desired constant concentration in the solution.

Another object of the invention is the provision of a filter which may be quickly and conveniently disassembled for cleaning or replacement of parts.

A further object of the invention is the provision of a filter which is simple in design, rugged in construction, economical to manufacture, and highly efficient in use.

Other objects and advantages of the invention will be apparent during the course of the following description and from the accompanying drawing in which:

Figure 1 is a vertical cross-sectional view taken through a tank partially filled with a liquid and having a bed of undissolved solids therein, illustrating a filter constructed according to the principles of this invention and which is in position for filtering the liquid as it is withdrawn from the tank;

Figure 2 is an enlarged fragmentary elevational view of the filter shown in Figure 1;

Figure 3 is a vertical cross-sectional view, with parts in elevation, illustrating details of construction of the filter device; and Figure 4 is a fragmentary longitudinal cross-sectional view, with parts in elevation, showing details of construction of the outlet pipe and associated screen of the filter construction.

In Figure 1 of the drawing, there is illustrated a tank or receptacle 10 within which is confined a liquid 11. If it is desired to provide a uniformly concentrated solution, the solids such as sugar, salt or the like are added to a liquid in quantities greater than is necessary to produce a saturated solution. The excess of the solids then falls to the bottom of the receptacle and forms a bed such as indicated at 12.

When removing the saturated solution from the receptacle any movement of liquid tends to stir the solids at the bottom causing them to rise in suspension. Unless filtered, the solution being removed will vary in its concentration depending on the amount of solid material held in suspension. If it is desired that the concentration be uniform or that no free solids be withdrawn with the solution from the receptacle, filtering is necessary. For such a purpose I provide a filter 13.

As best shown in Figures 2, 3 and 4, the filter comprises a body or shell 14 through the sidewall of which a plurality of inlet openings 15 are provided. End closures 16 and 17 serve to retain gravel 18 within the perforated body. Although gravel is shown as the filter material within the body 14 any of numerous materials may be used equally as well, such for example as spun glass, excelsior, sand, beads or other ball shaped bodies, anthracite coal particles, or any other inactive material providing mechanical filtration through tortuous paths. It will be noted that the gravel or other filtering material is sufficiently coarse to eliminate passing through any of the openings 15. An opening through the end closure member 17 permits filling the body with the filter material or removing it therefrom. An outlet for the filter includes a tubular member 19 threaded at one end as at 20 whereby to threadedly engage with the opening in the end closure 17. The end closure member may be made of material thin enough to seat within a single turn of the threads thereby eliminating the provision of internal threads in the closure member. A screen member 21, at the open end of the outlet pipe 19, serves to block passage of the gravel into the outlet stream. The screen member is preferably tubular and has an annular set of axially extending slots or apertures 22 adjacent to the end closed by the closure member 23. It is to be understood, of course, that the screen section may be formed of any shaped openings provided they are smaller than the gravel. The other end 24 of the tubular portion of the screen member is inserted into the outlet pipe 19 in telescopic arrangement therewith and is retained in place preferably by friction to insure quick removal of parts.

The spaces between the irregular shaped gravel form numerous passageways or channels through which the solution may flow. These passageways are tortuous and include within their lengths many traps into which the foreign particles or solids to be removed from the solution are held. As the solid particles are trapped they in turn with each other or with the adjacent gravel form additional traps thereby maintaining a high efficiency in the filtering of solutions.

To clean the filter requires only that the gravel be removed and washed or that clean solution flow in reverse through the gravel in the filter thereby washing out the trapped material.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

In a filter construction having a perforated shell, end closures for said shell, one of said closures having a threaded opening therethrough, and loose filtering material within said shell, the improvements comprising a first tubular member threaded at one end for engagement through the opening in said one end closure to extend into said shell, a second tubular member having circumferentially spaced longitudinally extending slots located adjacent one end thereof, and a cap enclosure at said one end of the second tubular member, the other end of second tubular member being arranged for frictional telescopic connection with the end of said first tubular member extending into the shell, the arrangement being such as to locate the slotted and capped end of the second tubular member in spaced relation to the other of said end closures for the shell and surrounded by said filtering material.

GEO. C. HUPPERTZ.

REFERENCES CITED

The following references are of record in the file of this patent:

UNITED STATES PATENTS

| Number | Name | Date |
|---|---|---|
| 60,311 | Wiley | Dec. 4, 1866 |
| 386,909 | Wise | July 31, 1888 |
| 1,256,830 | Rodrigo | Feb. 19, 1918 |
| 1,356,187 | Burgard | Oct. 19, 1920 |

FOREIGN PATENTS

| Number | Country | Date |
|---|---|---|
| 13,261 | Great Britain | 1896 |
| 561,887 | France | Oct. 30, 1923 |